US012742521B2

(12) United States Patent
Mastio

(10) Patent No.: US 12,742,521 B2
(45) Date of Patent: Sep. 22, 2026

(54) SYSTEM FOR TRANSFORMING A PRODUCT

(71) Applicant: EIFHYTEC, Strasbourg (FR)

(72) Inventor: Simon Mastio, Niederroedern (FR)

(73) Assignee: EIFHYTEC, Strasbourg (FR)

( * ) Notice: Subject to any disclaimer, the term of this patent is extended or adjusted under 35 U.S.C. 154(b) by 191 days.

(21) Appl. No.: 18/847,559

(22) PCT Filed: Mar. 15, 2023

(86) PCT No.: PCT/EP2023/056633
§ 371 (c)(1),
(2) Date: Sep. 16, 2024

(87) PCT Pub. No.: WO2023/180142
PCT Pub. Date: Sep. 28, 2023

(65) Prior Publication Data

US 2025/0207732 A1 Jun. 26, 2025

(30) Foreign Application Priority Data

Mar. 22, 2022 (FR) ........................................ 2202531

(51) Int. Cl.
*F17C 9/04* (2006.01)
*F25J 1/00* (2006.01)

(52) U.S. Cl.
CPC ................. *F17C 9/04* (2013.01); *F25J 1/001* (2013.01); *F17C 2221/012* (2013.01);
(Continued)

(58) Field of Classification Search
CPC ...... F25J 1/001; F25J 2210/90; F25J 2215/10; F25J 2230/08; F17C 2201/054;
(Continued)

(56) References Cited

U.S. PATENT DOCUMENTS 6,029,473 A * 2/2000 Bravais ..................... F17C 5/04
62/925
12,281,758 B2 * 4/2025 Mastio ..................... F17C 5/06
(Continued)

FOREIGN PATENT DOCUMENTS

DE 10037163 A1 1/2002
WO 2005068847 A1 7/2005
WO 2015036708 A2 3/2015

*Primary Examiner* — Filip Zec
(74) *Attorney, Agent, or Firm* — Colson Law Group, PLLC

(57) ABSTRACT

A system for processing a product the product being in a gaseous state when at a pressure of 1 bar and a temperature of 283K, said system comprising:
- at least one liquid product reservoir,
- a main circuit for extracting a main product in the liquid state from the liquid product reservoir, and
- a recovery circuit comprising at least one thermal compressor configured to compress a gas at least in part by raising the temperature of said gas or of an intermediate agent such as a metal hydride, by means of a cold source and a hot source, and transfer means for transferring a recovery product resulting from evaporation within the liquid product reservoir to one of said at least one thermal compressor, the cold source of at least one of said thermal compressors being configured to receive cold energy from said main circuit.

12 Claims, 6 Drawing Sheets

(52) U.S. Cl.
CPC .. *F17C 2223/013* (2013.01); *F17C 2223/033* (2013.01); *F17C 2227/0164* (2013.01); *F17C 2265/032* (2013.01); *F25J 2210/90* (2013.01); *F25J 2215/10* (2013.01); *F25J 2230/08* (2013.01)

(58) Field of Classification Search
CPC .......... F17C 2201/056; F17C 2201/058; F17C 2221/012; F17C 2223/013; F17C 2223/0161; F17C 2223/033; F17C 2225/0123; F17C 2225/035; F17C 2225/036; F17C 2227/0135; F17C 2227/0164; F17C 2227/0306; F17C 2227/0309; F17C 2227/0393; F17C 2265/032; F17C 2265/037; F17C 2270/0184; F17C 3/00; F17C 9/04
See application file for complete search history.

(56) References Cited

U.S. PATENT DOCUMENTS

| | | | | |
|---|---|---|---|---|
| 2009/0249799 | A1* | 10/2009 | Lee | F17C 9/02 62/53.2 |
| 2012/0028140 | A1 | 2/2012 | Sutherland | |
| 2015/0219280 | A1* | 8/2015 | Braithwaite | F17C 3/00 62/48.3 |
| 2015/0219393 | A1* | 8/2015 | Sauer | F25J 1/002 62/48.2 |
| 2019/0101329 | A1 | 4/2019 | Ragot | |
| 2021/0372350 | A1* | 12/2021 | Seba | F02M 21/0218 |

* cited by examiner

[Fig. 1]
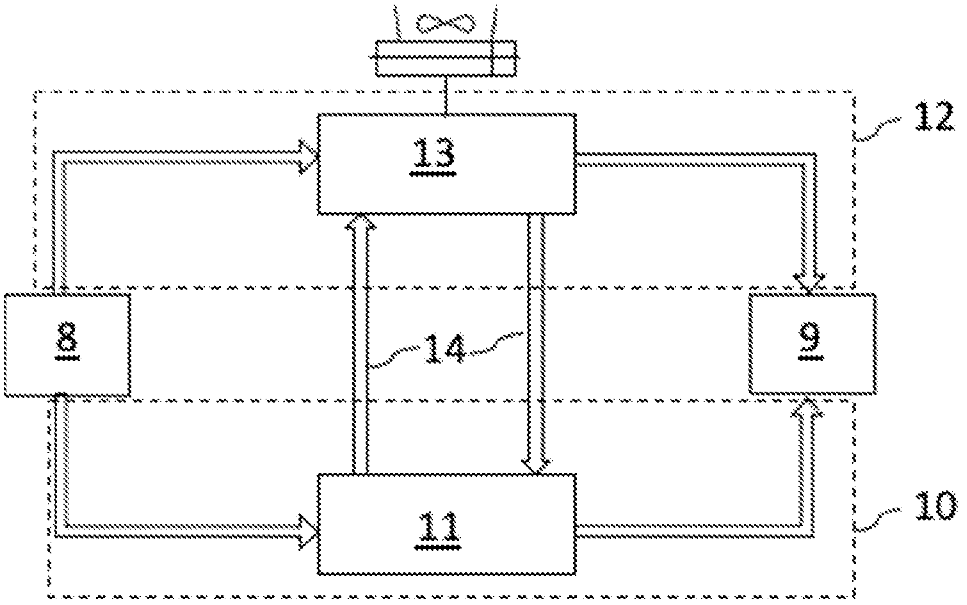
[Fig. 2]
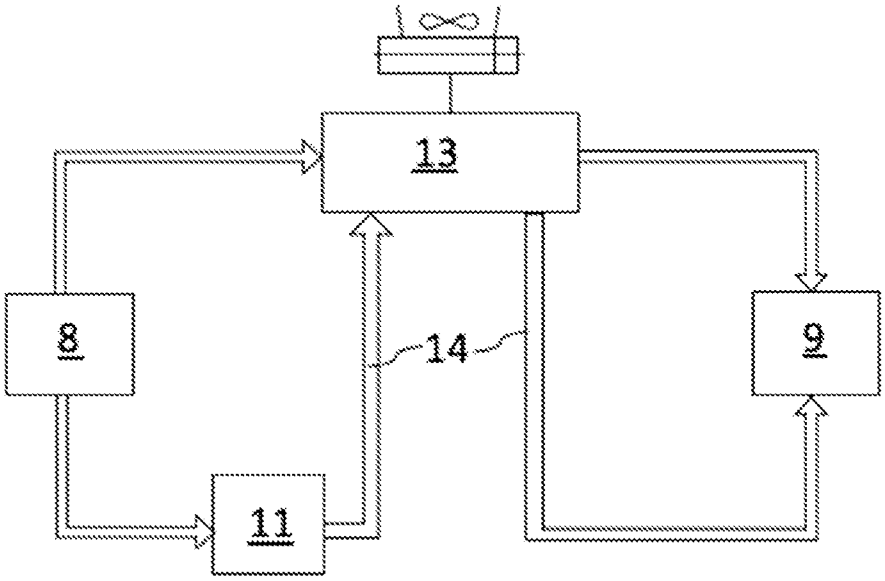

[Fig. 3]
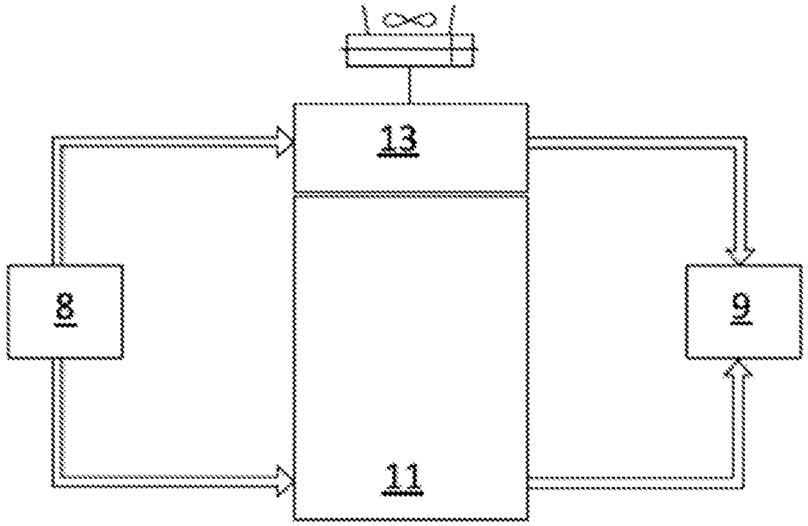
[Fig. 4]
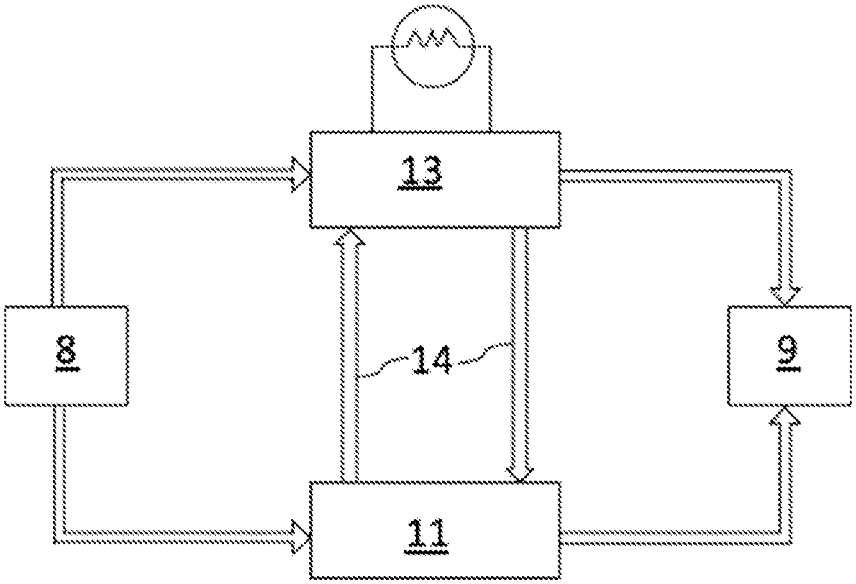

[Fig. 5]
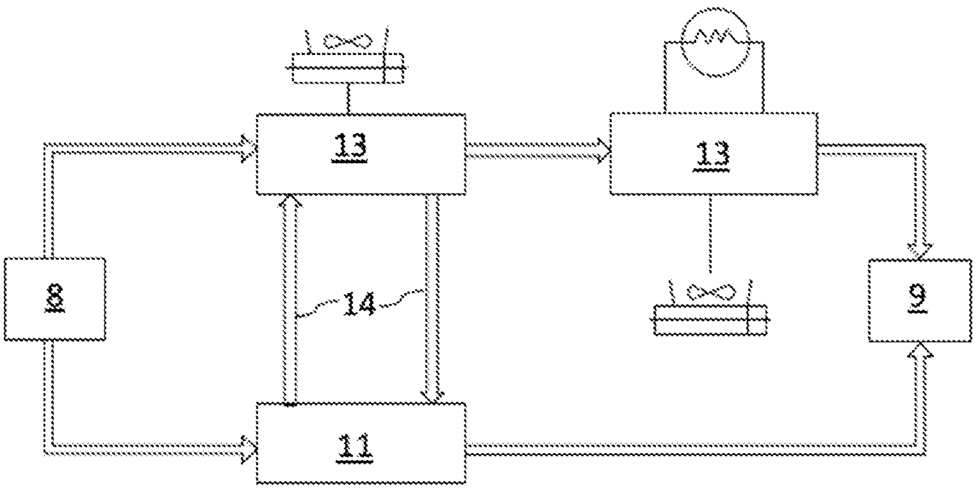
[Fig. 6]
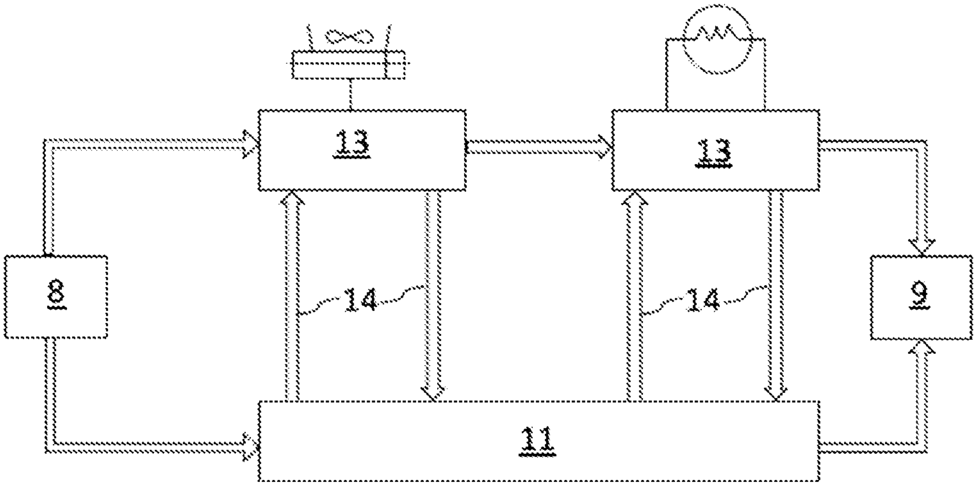
[Fig. 7]
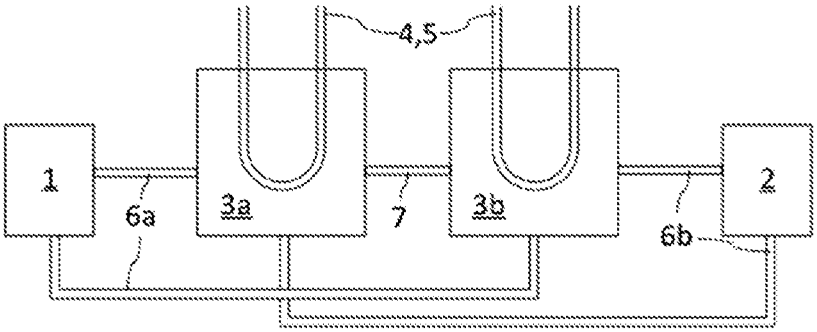

[Fig. 8]
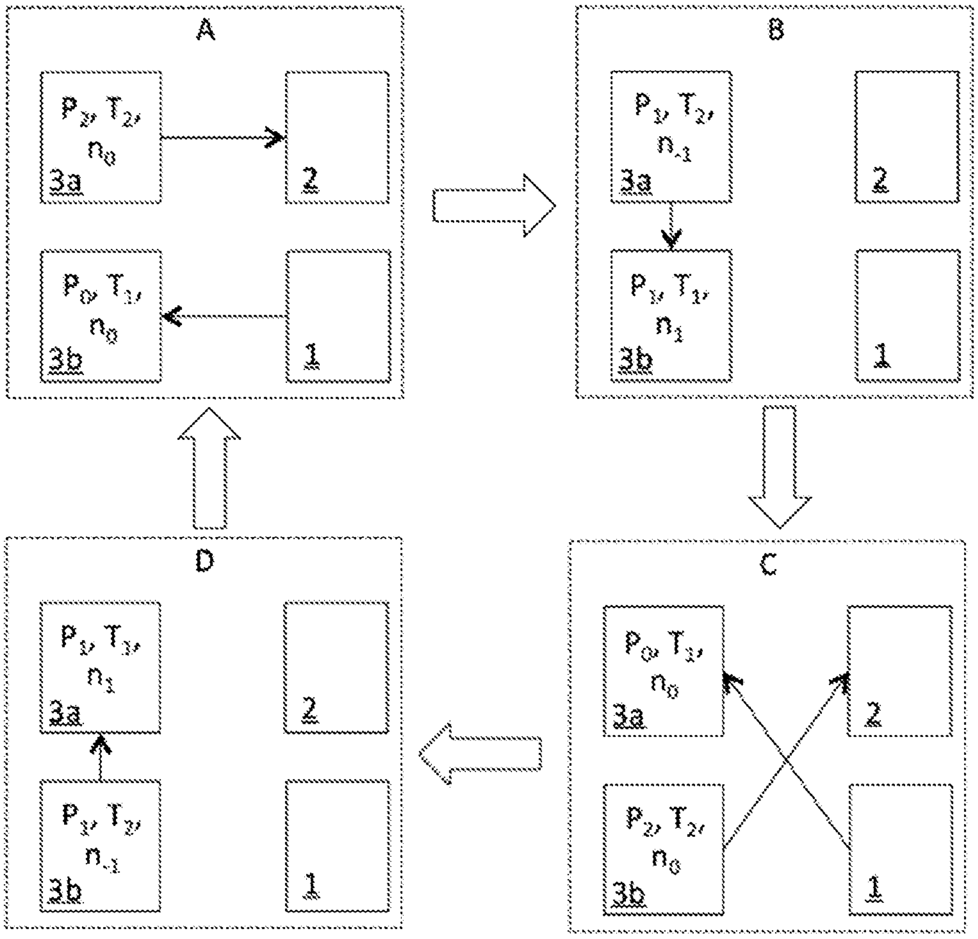

[Fig. 9]
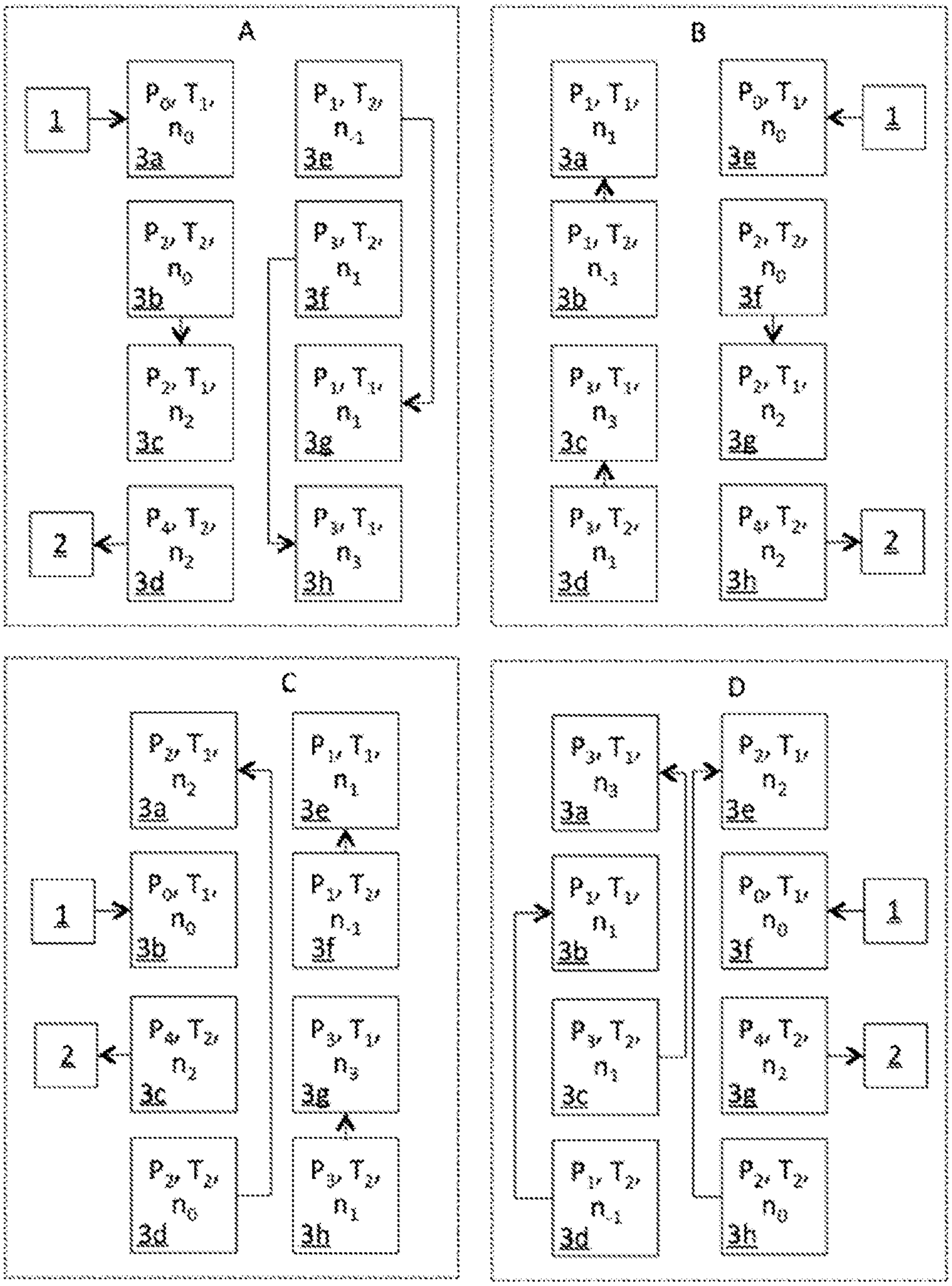

[Fig. 10]
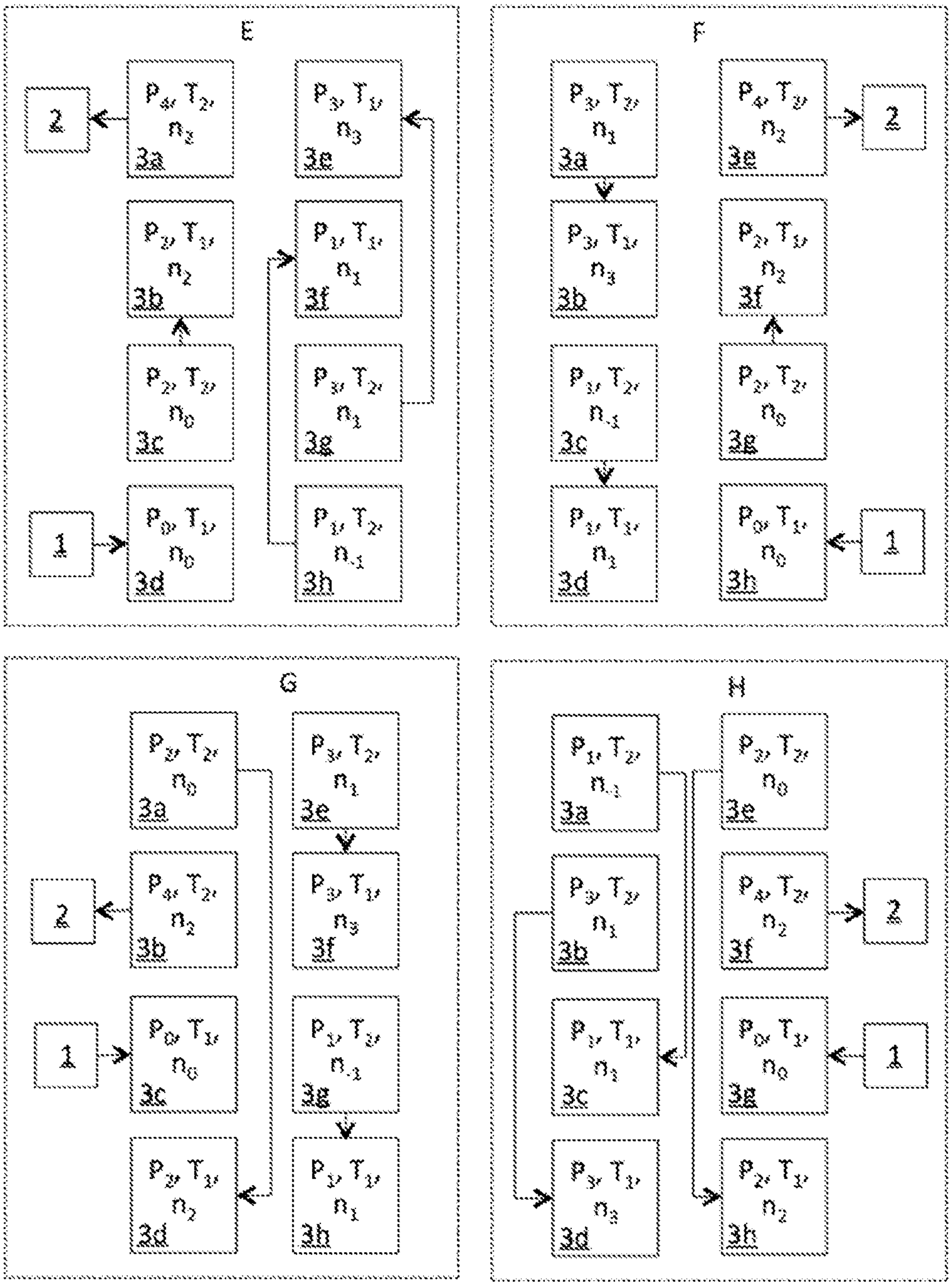

SYSTEM FOR TRANSFORMING A PRODUCT

The present invention relates to the transformation of a liquid product into a gaseous product. It concerns a system and a process for transforming a liquid product, in particular liquid dihydrogen.

Against a backdrop of strong growth in low-carbon solutions for mobility and the transport of goods and passengers, dihydrogen appears to be a promising fuel. Its use, combined with a fuel cell and an electric motor in a vehicle, could represent an alternative to fossil fuels or to the use of electric accumulators commonly used to power electric motors.

Because of its low density in gaseous form, dihydrogen is sometimes stored in liquid form to save space. In some cases, it must then be evaporated and compressed to a pressure of around 350 or 700 bar before it can be used as a fuel.

In order to remain in a liquid state at atmospheric pressure, hydrogen must be maintained at a temperature below 20K. As this temperature is well below ambient temperature, some of the liquid hydrogen inevitably evaporates, a phenomenon known as "boil-off".

The hydrogen resulting from boil-off is difficult to recover economically, as it is produced in small quantities at low pressures. In most cases, this hydrogen is released into the atmosphere, where it is lost. These losses can represent up to 1% of the amount of liquid hydrogen stored per day. There is therefore a particular interest in finding solutions to recover this hydrogen.

Documents WO2005068847 and WO2015036708 propose evaporation gas recovery systems. The energy consumed is optimized thanks to heat exchangers located in the evaporation gas circuit. However, these devices consume too much energy.

One object of the present invention is to propose a system for processing a product, said product being in a gaseous state when at a pressure of 1 bar and a temperature of 283 K, in which the gaseous product resulting from the boil-off is recovered by optimizing energy and/or material consumption.

The object of the present invention is to respond at least in part to the aforementioned objects by proposing a transformation system enabling the gaseous product resulting from the boil-off to be compressed using the cold energy contained in the product which is liquefied at low temperature. To this end, it proposes a system for transforming a product, said product being in the gaseous state when at a pressure of 1 bar and a temperature of 283K, said system comprising:

- at least one liquid product reservoir,
- a main circuit configured to extract a main product in the liquid state from the liquid product reservoir, and
- a recovery circuit comprising at least one thermal compressor configured to compress a gas at least in part by raising the temperature of said gas or of an intermediate agent such as a metal hydride, by means of a cold source and a hot source, and transfer means for transferring a recovery product resulting from evaporation within the liquid product reservoir to one of said at least one thermal compressor, the cold source of at least one of said thermal compressors being configured to receive cold energy from said main circuit.

Thanks to these provisions, the recovery product resulting from the boil-off phenomenon can be compressed to a pressure level that makes it recoverable, with low energy consumption.

Further features include:

- the main circuit may comprise at least one evaporator and transfer means for transferring a main product in the liquid state from the liquid product reservoir to one of said at least one evaporator, thereby making use of the cold energy emitted by the main product as it evaporates,
- said cold source of at least one of said at least one thermal compressor may comprise a cold circuit configured to be traversed by a heat transfer fluid thermally connected to said evaporator, which is a simple and effective mode of realization of the invention,
- said cold source of at least one of said at least one thermal compressor may comprise a cold circuit configured to be traversed by said main product, thereby optimizing the use of the cold energy contained in the liquefied main product,
- the heat source of at least one of said at least one thermal compressor can be thermally connected to the ambient air, which is an energy-efficient heat source,
- the recovery circuit may comprise:
  - at least one first thermal compressor, whose cold source is configured to receive cold energy from said main circuit and whose hot source is thermally connected to the ambient air, and
  - downstream of said at least one first thermal compressor with respect to the movement of said second gaseous product, at least one second thermal compressor, the cold source of which is configured to receive cold energy from said main circuit or ambient air and the hot source of which is thermally connected to a source of waste heat or electric heating,
  - which allows to achieve a high level of compression of the recovery product while optimizing energy consumption,
- at least one thermal compressor may be a multistage type thermal compressor comprising an upstream source, a target, and at least one group of reservoirs each comprising at least two reservoirs, said multistage thermal compressor comprising a means for heating and a means for cooling the content of each reservoir, connected respectively to a hot source and a cold source, each group further comprising:
  - transfer means for transferring gas directly from said upstream source to each reservoir and directly from each reservoir to said target, and
  - for each reservoir of said group, bidirectional transfer means enabling gas to be transferred directly between this reservoir and at least one other reservoir of said group,
  - in this way, the gas, which in the context of the present invention is the recovery product, can be compressed to a high pressure by thermal compression, thus avoiding the problems of noise and wear on mechanical parts, while enabling an energy-efficient process.
- said multi-stage thermal compressor can comprise two groups of reservoirs, thereby optimizing its operation, and in particular enabling the multi-stage thermal compressor to be fed and compressed gas to be produced continuously,
- said multi-stage thermal compressor may comprise at least three, preferably at least four, receivers in each group, thus enabling the gas to be pressurized in several stages, and thus achieving a greater pressure rise for a given temperature difference,

- the hot source can be a waste heat source, such as a biomass dihydrogen production plant or an electrolyser, which makes it possible to recover the heat produced, and thus reduce the energy costs consumed by the thermal compressor, whether a multi-stage thermal compressor or another type of thermal compressor,
- all reservoirs in the same unit can have the same volume, simplifying the multi-stage thermal compressor.

The present invention also relates to a process for transforming a product located in a liquid product reservoir, said product being a product which is in the gaseous state when at a pressure of 1 bar and a temperature of 283K, said process comprising the following steps:

- in a main circuit:
  - extraction of a main product in liquid state from said liquid product reservoir,
- in a recovery circuit:
  - evaporation of liquid product in said liquid product reservoir to obtain a gaseous recovery product,
  - transferring said recovery product to at least one thermal compressor,
  - in said at least one thermal compressor, compressing said recovery product at least in part by raising the temperature of said recovery product or of an intermediate agent such as a metal hydride, by means of a cold source and a hot source, said cold source receiving cold energy from said main circuit.

Thanks to these provisions, the recovery product resulting from the boil-off phenomenon can be compressed to a pressure level that makes it recoverable, with low energy consumption.

Further features include:

- said process can further comprise, in the main circuit, after the extraction step, a step of evaporation of said main product, which makes it possible to use the cold energy emitted by the main product during its evaporation,
- the temperature of the liquid product in the liquid product reservoir can be less than 123 K, enabling air gases to be used in the process according to the invention,
- the pressure of the gaseous product downstream of said at least one thermal compressor can be greater than or equal to 300 bar, making it suitable for use in the mobility sector, for example,
- the said compression of the recovery product can be carried out at least in part by a cyclic process of thermal compression of a gas, which in the context of the present invention is the recovery product, in which several reservoirs of a group carry out a cycle during which they perform a pressure rise in contact with a reservoir or a succession of hotter reservoirs, then a pressure drop in order to raise the pressure of other cooler reservoirs. The multi-stage type thermal compressor can be used in a cyclic process for thermally compressing a gas in a plurality of reservoirs of at least one group of said thermal compressor, each cycle comprising for each reservoir of each group the following steps:
  - cooling the gas contained in the reservoir and transferring gas from the source to the reservoir,
  - transfer of gas from a donor reservoir to said reservoir, said donor reservoir being the one whose gas is at the lowest pressure among the reservoirs of said group whose gas is at a higher pressure and temperature than the gas of said reservoir, until equalization of the pressures in said reservoir and said donor reservoir, if necessary, repetition of this step as long as there is another reservoir of said group whose gas is at a higher pressure and temperature than the gas of said reservoir,
  - heating of the gas contained in the reservoir and transfer of gas from the reservoir to the target,
  - transfer gas from said reservoir to a receiving reservoir, said receiving reservoir being the one whose gas is at the highest pressure among the reservoirs of said group whose gas is at a lower pressure and temperature than the gas of said reservoir, until equalization of the pressures in said reservoir and said receiving reservoir, if necessary repeating this step as long as there is another reservoir of said group whose gas is at a lower pressure and temperature than the gas of said reservoir,
  - the step of cooling the gas contained in the reservoir and transferring gas from the upstream source to said reservoir being carried out successively for each reservoir of said group,
  - which enables the gas to be compressed to a high pressure by thermal compression, thus avoiding problems of noise and wear on mechanical parts. This process is particularly energy-efficient, since the heat used to raise the pressure in one reservoir is used to compress the content of other reservoirs as the pressure drops, and compression can take place in cascade.
- said thermal compression process in a multi-stage thermal compressor can take place in a plurality of reservoirs in two groups, whereby the steps of cooling the gas contained in one reservoir and transferring the gas from the upstream source can take place in turn to one of the reservoirs in one group and then to one of the reservoirs in the other group, thereby optimizing the process and, in particular, enabling the multi-stage thermal compressor to be fed and compressed gas to be produced continuously,
- during the step of transferring gas from a donor reservoir of the same group whose gas is at a higher pressure and temperature to said reservoir, the transferred gas can be cooled to reduce the temperature rise of the content of said reservoir, thereby maintaining the temperature difference between a reservoir rising in pressure and a reservoir falling in pressure, this difference making it possible to optimize the compression of the gas in said reservoir,
- each group of reservoirs can comprise at least three, preferably at least four reservoirs, and the two transfer steps can each be repeated at least twice, preferably at least three times, enabling the gas to be subjected to several pressure stages, and thus to achieve a greater pressure rise for a given temperature difference,
- said thermal compression process, whether using a multi-stage type thermal compressor or not, can further comprise a gas compression step, after a first thermal compression, in a metal hydride compressor, which makes it possible to combine a first compression offering the advantages of the thermal compressor, followed by a thermochemical compression when the amount of cold energy supplied by the main circuit is not sufficient to achieve the desired compression level,
- during the step of cooling the gas contained in a first reservoir, heat can be extracted from said first reservoir and used in the step of reheating the gas contained in a second reservoir, thus optimizing the energy consumption of the process, at least two steps can be carried out simultaneously, a first step including a gas transfer between a first and a second entity, these two entities being the upstream source and a reservoir, two reservoirs, or a reservoir and the target, and a second step including a gas transfer between a third and a fourth entity, these two entities being the upstream source and a reservoir, two reservoirs, or a reservoir and the target, the first, second, third and fourth entities being four distinct entities, which makes it possible to optimize the cycle, several different stages taking place at the same time in several different reservoirs of the multi-stage thermal compressor, or even of the same group.

the step of transferring gas from the upstream source to a first reservoir can take place simultaneously with the step of transferring gas from a second reservoir to a receiving reservoir or to the target, thus optimizing the cycle, with several different steps taking place at the same time in several different reservoirs of the multi-stage thermal compressor, or even of the same group.

The present invention will be better understood on reading the detailed description that follows, with reference to the appended figures in which:

FIG. 1 is a schematic view of a transformation system according to the invention comprising a thermal compressor whose cold source comprises a cold circuit through which a heat transfer liquid flows, the cold energy of which comes from the main circuit, and whose hot source is thermally connected to the ambient air.

FIG. 2 is a schematic view of a processing system according to the invention, comprising a thermal compressor whose cold source comprises a cold circuit through which the main product flows in gaseous form, and whose hot source is thermally connected to the ambient air.

FIG. 3 is a schematic view of a processing system according to the invention, comprising a thermal compressor whose cold source comprises a cold circuit through which the main product circulates in the evaporator, and whose hot source is thermally connected to the ambient air.

FIG. 4 is a schematic view of a transformation system according to the invention, comprising a thermal compressor whose cold source comprises a cold circuit through which a heat-transfer liquid flows, and whose hot source is hotter than the ambient air.

FIG. 5 is a schematic view of a transformation system according to the invention comprising a first thermal compressor whose cold source comprises a cold circuit through which flows a heat transfer liquid whose cold energy comes from the main circuit and whose hot source is thermally connected to the ambient air, and a second thermal compressor whose cold source is thermally connected to the ambient air and whose hot source is hotter than the ambient air.

FIG. 6 is a schematic view of a transformation system according to the invention comprising a first thermal compressor whose cold source comprises a cold circuit through which a heat transfer liquid flows, the cold energy of which comes from the main circuit, and whose hot source is thermally connected to the ambient air, and a second thermal compressor whose cold source comprises a cold circuit through which a heat transfer liquid flows, and whose hot source is hotter than the ambient air.

FIG. 7 is a schematic view of a multi-stage thermal compressor according to one embodiment of the invention, FIG. 8 is a schematic view of the steps involved in a thermal gas compression process as described in FIG. 7, FIG. 9 is a schematic view of the first stages of a process for thermally compressing a gas in a multi-stage thermal compressor according to a preferred embodiment of the invention, FIG. 10 is a schematic view of the steps completing the process begun in FIG. 9.

The conversion system described in this invention, several of which are illustrated in FIGS. 1 to 6, enables a liquid product to be converted into a compressed gaseous product. The product concerned by the invention is in a gaseous state when it is at a pressure of 1 bar and a temperature of 283K.

The product concerned by the invention is preferably dihydrogen. However, it can be any other product, such as oxygen, nitrogen, methane, helium or natural gas, for example.

The system according to the invention comprises at least one liquid product reservoir 8, and in some embodiments may comprise at least one compressed gaseous product reservoir 9.

In the liquid product reservoir 8, the temperature is preferably below 123K, for example between 15 and 100K, and the pressure is preferably between 1 and 10 bar, for example 1 bar.

In the gaseous product reservoir, the temperature is preferably between 260K and 310K and the pressure is greater than or equal to 2 bar, preferably greater than 300 bar.

The system according to the invention also includes a main circuit 10 configured to be traversed by a first portion of the product, called the main product, initially stored in the liquid product reservoir 8.

The main circuit 10 may include at least one evaporator 11.

In the present invention, the term "evaporator" refers to any physical entity in which the main product can evaporate, i.e. change from the liquid to the gaseous state. The evaporator 11 can thus be an apparatus dedicated to evaporation, or simply a pipe or any place in which conditions are such that the main product, initially in the liquid state, passes into the gaseous state.

When the system according to the invention comprises an evaporator 11, a single evaporator 11 can be used, or a plurality of evaporators 11 can be arranged in parallel.

The main circuit 10 includes transfer means for extracting the main product in the liquid state from the liquid product reservoir 8, in some embodiments to an evaporator 11. In this case, the transfer may be direct, or the main product may pass through other devices between the liquid product reservoir 8 and an evaporator 11, such as a cryogenic pump. The main circuit 10 is thus configured to extract the main product in liquid state from the liquid product reservoir 8. The main circuit 10 may also include transfer means for transferring the main product to a gaseous product reservoir 9, for example from the main product in gaseous state from an evaporator 11 to a gaseous product reservoir 9. In this case, the transfer may be direct, or the main product may pass through other devices between an evaporator 11 and the gaseous product reservoir 9.

The system according to the invention also includes a recovery circuit 12 configured to be traversed by a second part of the product, called recovery product, initially stored in the liquid product reservoir 8. The recovery product is the result of the "boil-off" phenomenon: it is the product which evaporates naturally as a result of the heating taking place in the liquid product reservoir 8. All or only part of the product resulting from the "boil-off" evaporation can be sent to the recovery circuit 12 and constitute the recovery product.

The recovery circuit 12 includes at least one thermal compressor 13.

In the context of the present invention, the term "thermal compressor" refers to any device capable of compressing a gas at least in part by raising the temperature of that gas, or by raising the temperature of an intermediate agent such as a metal hydride. To generate this temperature rise, the thermal compressor 13 uses a cold source and a hot source.

According to a preferred embodiment of the invention, at least one thermal compressor 13 is of the multi-stage type as described below. In embodiments with several thermal compressors 13, some or all of the thermal compressors 13 may be of the multi-stage type.

A single thermal compressor 13 can be used, or a plurality of thermal compressors 13 can be arranged in series, to operate several compression stages, and/or in parallel.

The recovery circuit 12 includes transfer means for transferring the gaseous recovery product from the liquid product reservoir 8 to a thermal compressor 13. This transfer may be direct, or other devices may be used to transfer the recovery product between the liquid product reservoir 8 and a thermal compressor 13. The recovery circuit 12 is thus configured to extract gaseous recovery product from the liquid product reservoir 8. The recovery circuit 12 can also include transfer means for transferring the compressed recovery product from a thermal compressor 13 to a gaseous product reservoir 9. This transfer may be direct, or other means may be used to convey the recovery product between a thermal compressor 13 and the gaseous product reservoir 9.

In the case where the system according to the invention comprises a single gaseous product reservoir 9, the main 10 and recovery 12 circuits can transfer the main and recovery products into this single gaseous product reservoir 9. On the other hand, if the system according to the invention comprises a plurality of gaseous product reservoirs 9, the main and recovery circuits 10 and 12 can either transfer the main and recovery products into the same gaseous product reservoir 9, or into separate gaseous product reservoirs 9.

In other embodiments, the system according to the invention comprises a single gaseous product reservoir 9 downstream of only one of the main or recovery circuits, or the system according to the invention may comprise no gaseous product reservoir 9 at all. Indeed, once compressed in the at least one thermal compressor 13, the recovery product can undergo further steps or be used without prior storage. The main product, after losing some of its cold energy from the liquid product reservoir 8, may also undergo further steps or be used without prior storage.

In the present invention, the cold source of at least one of the thermal compressors 13 is configured to receive cold energy from the main circuit 10. The main circuit 10 is initially flowed through by the main product in liquid state, at a cold temperature, for example below 123K. The cold energy contained in the liquid main product is then advantageously reused.

In a first embodiment of the invention shown in FIGS. 1 and 4 to 6, cold energy is extracted from the main circuit 10 at an evaporator 11, taking advantage of the fact that cold energy leaves the main product during evaporation. The cold source of at least one thermal compressor 13 may then comprise a cold circuit 14, configured to be traversed by a heat transfer fluid distinct from the main product. The cold circuit 14 is then thermally connected to at least one evaporator 11, in order to transfer cold energy from this evaporator 11 to the heat transfer fluid. The heat transfer fluid is then sent to a thermal compressor 13 to form the cold source.

The heat transfer fluid can be of the glycol type. It is preferably a silicone-based fluid, which has the advantage of being in the liquid state up to temperatures of around 163K.

In a second embodiment, the cold source of at least one thermal compressor 13 comprises a cold circuit 14 configured to be traversed by the main product. As illustrated in FIG. 3, the cold energy can then be extracted from the main circuit 10 at an evaporator 11, the evaporator 11 being placed as close as possible to the thermal compressor so that the cold energy is transferred directly from the main product to the thermal compressor 13. In this case, evaporator 11 has the function of cold circuit 14 and the cold energy released by evaporation of the main product directly constitutes the cold source of at least one thermal compressor 13, without using a heat transfer fluid separate from the main product. This can have the disadvantage that the main product is then two-phase at the cold source, making heat exchanges with the thermal compressor 13 more complex to manage. In another embodiment shown in FIG. 2, cold energy is extracted from the main circuit 10 downstream of an evaporator 11, when the main product is in gaseous state. In another embodiment, cold energy is extracted from the main circuit 10 upstream or in the absence of an evaporator 11, when the main product is in a liquid state.

The main product is such that it is preferably in the liquid state at temperatures below 163K. The heat transfer fluids normally used by those skilled in the art cannot go below this temperature in their liquid state. The use of the main product as the cold source for the thermal compressor 13, without any intermediate heat transfer fluid, therefore enables operation at lower temperatures, which improves the efficiency of the thermal compressor 13.

In a particular embodiment, the pressure in the liquid product reservoir 8 can be increased to a value of 10 bar, for example. The need to guarantee high insulation quality, in order to minimize the quantity of gas forming in the liquid product reservoir 8 as a result of the boil-off phenomenon, is not compatible with a very high-pressure reservoir. However, a value of 10 bar can be achieved. In this way, the recovery product can be recovered in the recovery circuit 12 at a higher pressure, and therefore enters the first thermal compressor 13 at a higher pressure. This results in a higher outlet pressure from the thermal compressor 13.

The hot source of at least one thermal compressor 13 can be thermally connected to the ambient air, for example with a convector to promote heat exchange. This hot source consumes little energy, and can have a sufficient temperature differential with the cold source coming from the main circuit 10 to operate the desired compression in the thermal compressor 13.

With a heat transfer fluid at 163K, and two multi-stage thermal compressors 13 as described below arranged one downstream of the other, each thermal compressor 13 using the main circuit 10 as a cold source and ambient air as a thermally connected hot source, a compression ratio of the order of 20 can be achieved. For example, with a recovery product pressure of 10 bar at the inlet to the first thermal compressor 13, an outlet pressure of around 200 bar can be obtained from the second thermal compressor 13. Depending on the application, and in particular the recovery product flow rate and the desired outlet pressure level of the at least one thermal compressor 13, a single thermal compressor 13 may suffice, or more than two thermal compressors 13 may be arranged in series.

Alternatively, if a hotter heat source is required to obtain a greater temperature differential with the cold source, and therefore a greater pressure ratio between the inlet and outlet of the heat compressor 13, the heat source of at least one heat compressor 13 can be connected to a waste heat source, which optimizes the energy consumption of the system, to an electric heater, or to any other heat source known to the skilled person and suitable for a heat compressor, as illustrated in FIGS. 4 to 6.

Finally, the heat source of at least one thermal compressor can be linked to a catalytic combustion device for part of the boil-off product evaporating inside the liquid product reservoir 8. In this case, only part of the boil-off product is sent to the recovery circuit 12, and another part of the boil-off product is sent to the catalytic combustion device.

These designs can achieve higher pressures, such as those required in a service station, 350 or 700 bar depending on the application. However, to obtain pressures of this order, while using a multi-stage thermal compressor 13, it is necessary to increase the number of reservoirs used in the compressor and therefore the number of stages and the complexity of the associated process.

According to a particular mode of the invention illustrated in FIG. 5, the system according to the invention comprises at least two thermal compressors 13 in series, the cold source of a first thermal compressor being configured to receive cold energy from the main circuit 10, and the hot source of a second thermal compressor 13 being configured warmer than the ambient air. The cold source of the second thermal compressor 13 can then be thermally connected to the ambient air. This cold source consumes little energy, and can have a sufficient temperature differential with the hot source to operate the desired compression in the second thermal compressor 13.

Taking the above example, with an inlet pressure of the first thermal compressor 13 of 10 bar and an outlet pressure of 200 bar, the second thermal compressor 13 can be configured with a pressure ratio of 1.75, or 3.5, to obtain an outlet pressure of 350 bar, respectively 700 bar, while maintaining an attractive energy efficiency.

Such numerical values are given by way of example and in no way limit the scope of the invention; the person skilled in the art will know how to configure the system to best meet the needs of each application.

In another particular embodiment of the invention, illustrated in FIG. 6, the system according to the invention comprises at least two thermal compressors 13 in series, each of which allows the recovery product to pass through a compression stage:

- a first thermal compressor 13 has its cold source configured to receive cold energy from the main circuit 10, and its hot source thermally connected to the ambient air, and
- a second thermal compressor 13, located downstream of the first thermal compressor, has its cold source configured to receive cold energy from the main circuit 10, and its hot source thermally connected to a source of waste heat, to an electric heater, or to a device for catalytic combustion of part of the boil-off product evaporating inside the liquid product reservoir 8.

This arrangement (FIGS. 5 and 6) of two thermal compressors 13 in series is particularly advantageous when the amount of cold energy coming from the main circuit 10, and the differential with the ambient air temperature, is not sufficient to compress the recovery product to the required pressure level. This results in a first stage of compression in the first thermal compressor 13, which is insufficient but consumes little energy. The second thermal compressor 13, which consumes more energy due to its hot source, can bring the recovery product up to the required pressure level, since the pre-compression stage carried out by the first thermal compressor enables it to start from a higher inlet pressure.

In the case where the two thermal compressors 13 above are such that their cold source is configured to receive cold energy from the main circuit 10 (FIG. 6), the system can comprise a first cold circuit 14 associated to the first thermal compressor 13 in which circulates a heat transfer fluid at a temperature between 163K and 180K, and a second cold circuit 14 associated to the second thermal compressor 13 in which circulates a heat transfer fluid at a temperature between 163K and 233K. As the main product leaves the liquid product reservoir 8 at a temperature of between 0K and 163K, the heat transfer fluid, which cannot go below 163K, is only able to capture part of the cold energy contained in the main product. The use of a second cold circuit enables a greater proportion of this cold energy to be utilized. The presence of two cold circuits 14 therefore optimizes the use of the cold energy released by the main product in the main circuit 10. Depending on the application, the system according to the invention may comprise three or more thermal compressors 13 in series, each connected to a cold circuit 14, to make the most of this advantage.

The processing system according to the invention can be used in a process for processing a product located in a liquid product reservoir 8. This process comprises the following steps:

- in a main circuit 10:
  - extraction of a main product in liquid state from said liquid product reservoir 8,
  - if necessary, evaporation of the main product 10,
  - if necessary, transfer of said main product to a main gaseous product reservoir 9,
- in a recovery circuit 12:
  - evaporation of liquid product in said liquid product reservoir 8 to obtain a gaseous recovery product,
  - transferring said recovery product to a thermal compressor 13,
  - in said thermal compressor 13, compression of said recovery product at least in part by raising the temperature of said recovery product or of an intermediate agent such as a metal hydride, by means of a cold source and a hot source, said cold source receiving cold energy from said main circuit 10,
  - if necessary, transfer of the recovery product compressed by said thermal compressor 13 to said main gaseous product reservoir 9 or to a gaseous product recovery reservoir 9.

As mentioned above, it is advantageous in the present invention to use a multi-stage type thermal compressor 13 as illustrated in FIGS. 7 to 10.

In the present application, the term "multi-stage thermal compressor" is used exclusively to describe a thermal compressor of the type described below, and illustrated in FIGS. 7 to 10. The multi-stage thermal compressor 13, illustrated in FIG. 7, comprises an upstream source 1, a target 2, and one or more groups of reservoirs 3.

The multi-stage thermal compressor 13 is used to compress gas from an upstream source 1, at which the gas is at a pressure $P_0$, to a pressure $P_{target}$. In the present invention, the gas compressed by the multi-stage thermal compressor 13 is the recovery product.

The reservoirs 3 are able to contain a certain volume of said gas in a sealed manner. Within a group, the reservoirs 3 preferably all have the same volume, e.g. 50 liters.

The multi-stage thermal compressor 13 includes means for heating 4 and means for cooling 5 the content of each reservoir 3. The means for heating 4 recovers thermal energy, or calories, from a hot source, and the means for cooling 5 recovers cold energy, or frigories, from a cold source. For example, means for heating 4 and means for cooling 5 bring a heat transfer fluid into contact with the content of each reservoir 3. If the heat transfer fluid is warmer, respectively colder, than the content of a reservoir 3, it can be used to heat, respectively cool, said content.

Means for heating 4 can also be an electrical resistor immersed in the reservoir.

The heat source of the multi-stage thermal compressor 13, or any other type of thermal compressor 13 used in the present invention, can be connected to an electrolyzer or a biomass dihydrogen production unit. Thus, if the gas is dihydrogen, the heat generated to produce this dihydrogen can be recovered in the thermal compressor 13. Depending on where the multi-stage thermal compressor 13 is installed, other locally available sources of waste heat can be used as a hot source to reduce the cost of the energy consumed. This could be a waste collection site, for example, or any other industrial site where heat is generated.

The multi-stage thermal compressor 13 also includes transfer means 6*a* for transferring gas directly from the upstream source 1 to each reservoir 3 of a group, and transfer means 6*b* for transferring gas directly from each reservoir 3 of a group to the target 2. A direct transfer here refers to a transfer that does not pass through another reservoir 3 of the same group or of another group, or through the upstream source 1 or target 2.

Finally, the multi-stage thermal compressor 13 includes bi-directional transfer means 7 for transferring gas directly from each reservoir in a group to each other reservoir in the same group. A direct transfer here refers to a transfer that passes neither via another reservoir 3 of the same group or of another group, nor via the upstream source 1 or target 2. So, considering any pair of reservoirs 3 of the same group, it is possible to transfer gas directly between these two reservoirs 3, in both directions.

The multi-stage thermal compressor 13 can be used in a cyclic process to thermally compress a gas in a plurality of reservoirs 3 in at least one group. Each cycle comprises the following steps for each reservoir 3*a* of each group:

- cooling the gas contained in reservoir 3*a* to a cold temperature $T_1$, and transferring gas from upstream source 1 to said reservoir 3*a*. At the end of this step, reservoir 3*a* contains gas at pressure $P_0$ and temperature $T_1$.
- transfer of gas from another donor reservoir 3 to said reservoir 3*a*. The donor reservoir 3 is the one whose gas is at the lowest pressure among the reservoirs 3 of the same group whose gas is at a higher pressure and temperature than the gas contained in said reservoir 3*a*. The transfer takes place automatically when the bidirectional transfer means 7 is opened between reservoir 3*a* and donor reservoir 3, until the pressures in reservoir 3*a* and donor reservoir 3 equalize. It is during this step that the gas contained in said reservoir 3*a* is compressed. At the end of the first occurrence of this step, reservoir 3*a* contains gas at a pressure $P_1$ and a temperature $T_1$. This step can be repeated several times, as long as there is another reservoir 3 of said group whose gas is at a higher pressure and temperature than the gas contained in said reservoir 3*a*. The step may, for example, be repeated twice if the group comprises three reservoirs 3, or three times if the group comprises four reservoirs 3. Each time this step is repeated, the reservoir 3*a* rises one pressure stage. At the end of this step, reservoir 3*a* contains gas at a pressure $P_K$ and a temperature $T_1$, with K equal to the number of repetitions of the transfer step.
- heating of the gas contained in reservoir 3*a* to a hot temperature $T_2$, enabling a final pressure stage to be built up, and transfer of gas from said reservoir 3*a* to target 2. At the end of this stage, reservoir 3*a* contains gas at a pressure $P_{K+1}$ and a temperature $T_2$. The pressure $P_{K+1}$ is close to, or equal to, the pressure $P_{target}$.
- transferring gas from said reservoir 3*a* to another receiving reservoir 3. The receiving reservoir 3 is the one whose gas is at the highest pressure among the reservoirs 3 of the same group whose gas is at a lower pressure and temperature than the gas in said reservoir 3*a*. The transfer takes place automatically when the bidirectional transfer means 7 is opened between the reservoir 3*a* and the receiving reservoir 3, until the pressures in said reservoir 3*a* and said receiving reservoir 3 equalize. At the end of the first occurrence of this step, reservoir 3*a* contains gas at a pressure close to or equal to $P_K$ and a temperature $T_2$. This step can be repeated several times, as long as there is another reservoir 3 in the group whose gas is at a lower pressure and temperature than the gas in reservoir 3*a*. The step may, for example, be repeated twice if the group comprises three reservoirs 3, or three times if the group comprises four reservoirs 3. Each repetition of this step enables reservoir 3*a* to raise another reservoir 3 in the same group by one pressure stage. At the end of this step and its repetition until the end, reservoir 3*a* contains gas at a pressure close to or equal to $P_1$ and a temperature $T_2$.

If all the reservoirs 3 in the group have the same volume, the amount of gas in reservoir 3 can also be determined at each stage:

- at the end of the upstream source 1 cooling and transfer step, reservoir 3*a* contains $n_0$ moles of gas,
- at the end of one occurrence of the transfer step from a donor reservoir 3 to said reservoir 3*a*, said reservoir 3*a* contains $n_1$ moles of gas,
- at the end of the entire transfer step from one or more donor reservoirs 3 to said reservoir 3*a*, said reservoir 3*a* contains $n_K$ moles of gas,
- at the end of the heating step and transfer to target 2, reservoir 3*a* contains $n_{K-1}$ moles of gas,
- at the end of one occurrence of the transfer step from said reservoir 3*a* to a receiving reservoir 3, said reservoir 3*a* contains $n_{K-2}$ moles of gas,
- at the end of the entire transfer step from said reservoir 3*a* to one or more receiving reservoirs, said reservoir 3*a* contains $n_{-1}$ moles of gas.

The step of cooling the gas contained in the reservoir and transferring gas from the upstream source 1 to said reservoir 3*a* is carried out successively for each reservoir 3 of said group, and not for several reservoirs 3 at the same time. In this way, the group's reservoirs 3 each pass through this step, in turn, then follow the same cycle simultaneously, each with a time lag relative to the others.

In this process, the gas is thermally compressed by opening the transfer means between two reservoirs 3, the reservoir 3 in which the gas is most compressed allowing the gas in the other reservoir 3 to build up pressure. The reservoir 3 receiving the gas is in a cold state and the reservoir 3 delivering the gas is in a warm state. This means that, with an equivalent number of moles of gas in the two reservoirs 3, the hot reservoir 3 has a higher pressure and can give gas and increase the pressure in the cold reservoir 3. During each cycle, each reservoir 3 thus goes through a pressure build-up in a cold state, followed by a pressure drop in a hot state. During a cycle followed by a reservoir 3, it therefore only needs to be heated and cooled once.

Preferably, during the step of transferring gas from another reservoir 3 of the same group whose gas is at a higher pressure and temperature to said reservoir 3, the transferred gas is cooled. This maintains a cool temperature in the reservoir 3 receiving the hot gas, and thus preserves the temperature differential with other hot reservoirs 3. The transferred gas can be cooled prior to arrival in the reservoir 3, for example in the bidirectional transfer means 7 between the two reservoirs 3. Alternatively, the transferred gas can be cooled after its arrival in reservoir 3, by cooling the entire content of reservoir 3, for example by means for cooling 5. In a preferred embodiment of the invention, the content of a reservoir 3 cooled to cold temperature $T_1$ are kept at cold temperature $T_1$ until the reheating step. Similarly, the content of a reservoir 3 reheated to the hot temperature $T_2$ are preferably kept at the hot temperature $T_2$ until the cooling step. This ensures that the temperature differential between T1 and T2 is always available when a hot reservoir 3 is connected to a cold reservoir 3 to build up the latter's pressure.

In order to optimize the process cycle of the multi-stage thermal compressor 13, at least two process steps can be carried out simultaneously. A first step includes a gas transfer between a first and a second entity, these two entities being the upstream source 1 and a reservoir 3, two reservoirs 3, or a reservoir 3 and the target 2, and a second step includes a gas transfer between a third and a fourth entity, these two entities being the upstream source 1 and a reservoir 3, two reservoirs 3, or a reservoir 3 and the target 2. The first, second, third and fourth entities being four separate entities.

For example, the step of transferring gas from the upstream source 1 to a first reservoir 3*a*, . . . , 3*h* takes place simultaneously with the step of transferring gas from a second reservoir 3*a*, . . . , 3*h* to a receiving reservoir 3 or to the target 2. So when some reservoirs 3 of the multi-stage thermal compressor 13 perform certain steps, other reservoirs 3 perform other process steps, saving time.

In a preferred embodiment of the invention, in order to optimize the energy consumption of the process of using the multi-stage thermal compressor 13, during the step of cooling the gas contained in a first reservoir 3*a*, . . . , 3*h*, it is possible to use heat extracted from said first reservoir 3*a*, . . . , 3*h* in the step of reheating the gas contained in a second reservoir 3*a*, . . . , 3*h*. For example, a heat transfer fluid can be circulated from the first reservoir 3*a*, . . . , 3*h* to the second reservoir 3*a*, . . . , 3*h*.

A group of reservoirs 3 comprises at least two reservoirs 3, for example three, preferably four reservoirs 3. The choice of the number of reservoirs 3 is made, along with the other parameters of the multi-stage thermal compressor 13, as a function of the number of stages required to compress the gas from pressure $P_0$ at upstream source 1 to the desired pressure $P_{target}$ at target 2. Other parameters to be adjusted include the volumes of the reservoirs 3, and the temperatures $T_1$ and $T_2$ at which the reservoirs 3 are heated and cooled. It is advantageous to have an even number of reservoirs 3 in a group. This ensures that at each process step, one of the process steps takes place in each reservoir 3.

The multi-stage thermal compressor 13 may comprise a single group of reservoirs 3, but preferably two groups of reservoirs 3. In fact, the total number of steps in the cycle described above, including the repetitions of the second and fourth steps, is equal to twice the number of reservoirs 3 in a group. When the multi-stage thermal compressor 13 comprises a single group, only half of the steps can therefore be performed at the same time by one of the reservoirs 3. In particular, the gas transfer stages from the upstream source 1 to the target 2 are not performed by a single unit at each stage of the cycle. It may therefore be possible to have two groups operating in parallel, so that at each stage of the cycle, gas is transferred from the upstream source 1 to one of the reservoirs 3 of the multi-stage thermal compressor 13, and from one of the reservoirs 3 of the multi-stage thermal compressor 13 to the target 2. The number of reservoirs in each group can be different, but in order to obtain the above-mentioned advantage for two groups, it is necessary for both groups to have either an even or an odd number of reservoirs.

In a particular embodiment of the multi-stage thermal compressor 13, additional reservoirs 3 can be provided to enable multi-stage heating and cooling. This is useful if the heating and cooling stages take longer than the transfer stages; typically, if these stages take twice as long as the transfer stages, it may be useful to perform heating and cooling in two stages.

According to another particular embodiment of the multi-stage thermal compressor 13, an installation can be provided which initially operates between a first source pressure P0 and a target pressure P1. Then, in a second stage, part of the gas can be withdrawn at pressure P1 and used as a source at pressure P1. The device then raises the pressure to P2. This can be continued for as long as necessary to finally reach the target pressure.

In order to optimize energy consumption, the temperature of the cold source, and therefore of cooling $T_1$, can be as low as possible, i.e. the ambient temperature or the lowest cold source temperature available at the site of use.

The multi-stage thermal compressor 13 is particularly advantageous for small-scale installations, with a gas output at target 2 of between 1 and 100 kg per hour, for example.

FIG. 8 shows an example of a multi-stage thermal compressor 13 in which a group of two reservoirs 3*a*, 3*b* is provided. The volumes of reservoirs 3*a*, 3*b* are equal. In FIG. 8, the arrows illustrate the gas flows. The state of each reservoir is noted after the gas transfers have been completed.

The cycle comprises four stages:

step A:

- the gas contained in reservoir 3*a* is heated to temperature $T_2$ and part of this gas is transferred to target 2. At the end of this step, reservoir 3*a* contains $n_0$ moles of gas, at pressure $P_2=P_{target}$, and temperature $T_2$.
- the gas in reservoir 3*b* is cooled to temperature $T_1$ and gas is transferred from upstream source 1 to reservoir 3*b*. At the end of this step, reservoir 3*b* contains $n_0$ moles of gas, at pressure $P_0$, and temperature $T_1$.

step B:

- the bidirectional transfer means 7 is opened between reservoirs 3*a* and 3*b*, transferring gas from reservoir 3*a* to reservoir 3*b*. At the end of this step, reservoir 3*a* contains $n_{-1}$ moles of gas, at pressure $P_1$, and temperature $T_2$, and reservoir 3*b* contains $n_1$ moles of gas, at pressure $P_1$, and temperature $T_1$.

Steps C and D are identical to steps A and B, with reservoirs 3*a* and 3*b* swapped. At the end of step D, the cycle can be resumed at step A.

FIGS. 9 and 10 illustrate an example in which the multi-stage thermal compressor 13 comprises two groups of four reservoirs 3*a* to 3*d* and 3*e* to 3*h*. The volumes of reservoirs 3*a* to 3*d* are equal. The volumes of reservoirs 3*e* to 3*h* are equal. In FIGS. 9 and 10, the arrows illustrate gas flows. The state of each reservoir is noted after the gas transfers have been completed.

The cycle consists of eight steps A to H. We will describe the cycle followed by reservoir 3*a*:

step A: the gas in reservoir 3*a* is cooled to temperature $T_1$ and gas is transferred from upstream source 1 to reservoir 3*a*. At the end of this step, reservoir 3*a* contains $n_0$ moles of gas, at pressure $P_0$, and temperature $T_1$, step B: the bidirectional transfer means 7 is opened between reservoirs 3*a* and 3*b*, causing gas to be transferred from reservoir 3*b* to reservoir 3*a*. At the end of this step, reservoir 3*a* contains $n_1$ moles of gas, at pressure P1, and temperature T1.

step C: the bidirectional transfer means 7 is opened between reservoirs 3*a* and 3*d*, causing gas to be transferred from reservoir 3*d* to reservoir 3*a*. At the end of this step, reservoir 3*a* contains $n_2$ moles of gas, at pressure $P_2$, and temperature $T_1$.

step D: the bidirectional transfer means 7 is opened between reservoirs 3*a* and 3*c*, causing gas to be transferred from reservoir 3*c* to reservoir 3*a*. At the end of this step, reservoir 3*a* contains $n_3$ moles of gas, at pressure $P_3$, and temperature $T_1$.

step E: the gas contained in reservoir 3*a* is heated to temperature $T_2$ and part of this gas is transferred to target 2. At the end of this step, reservoir 3*a* contains $n_2$ moles of gas, at pressure $P_4=P_{target}$, and temperature $T_2$.

step F: the bidirectional transfer means 7 is opened between reservoirs 3*a* and 3*b*, causing gas to be transferred from reservoir 3*a* to reservoir 3*b*. At the end of this step, reservoir 3*a* contains $n_1$ moles of gas, at pressure $P_3$, and temperature $T_2$.

step G: the bidirectional transfer means 7 is opened between reservoirs 3*a* and 3*d*, causing gas to be transferred from reservoir 3*a* to reservoir 3*d*. At the end of this step, reservoir 3*a* contains $n_0$ moles of gas, at pressure $P_2$, and temperature $T_2$.

step H: the bidirectional transfer means 7 is opened between reservoirs 3*a* and 3*c*, causing gas to be transferred from reservoir 3*a* to reservoir 3*c*. At the end of this step, reservoir 3*a* contains $n_{-1}$ moles of gas, at pressure $P_1$, and temperature $T_2$. At the end of step H, the cycle can be resumed at step A.

All reservoirs 3*a* to 3*h* follow the above cycle, of course exchanging with the relevant reservoirs 3 at each transfer stage:

reservoir 3*b* begins the above cycle at step C,
reservoir 3*c* begins the above cycle at step G,
reservoir 3*d* begins the above cycle at step E,
reservoir 3*e* begins the above cycle at step B,
reservoir 3*f* begins the above cycle at step D,
reservoir 3*g* begins the above cycle at step H,
reservoir 3*h* begins the above cycle at step F, The presence of two groups in the multi-stage thermal compressor 13 means that, during each stage of the cycle, a reservoir 3 receives gas from the upstream source 1 and a reservoir 3 sends gas to the target 2. For example, in step A, the 3*d* reservoir of the first group of reservoirs 3 sends gas to the target 2, in step B, the 3*h* reservoir of the second group of reservoirs 3, then in step C, the 3*c* reservoir of the first group of reservoirs 3, and so on. On the other hand, in step A, reservoir 3*a* of the first group of reservoirs 3 receives gas from the upstream source 1, in step B, reservoir 3*e* of the second group of reservoirs 3, then in step C, reservoir 3*b* of the first group of reservoirs 3, and so on.

Considering this example, and carrying out the heating and cooling stages over the duration of two transfer stages, this leads to the provision of ten reservoirs 3 instead of eight. The ten reservoirs then form a single group, and each reservoir 3 can be linked to three other reservoirs 3 out of the ten, by bidirectional transfer means; each reservoir 3 must of course also be linked to the source and target by transfer means.

Although the above description is based on particular embodiments, it is by no means limitative of the scope of the invention, and modifications may be made, in particular by substitution of technical equivalents or by different combination of all or some of the features developed above.

The invention claimed is:

1. A system for processing a product, said product being in the gaseous state when at a pressure of 1 bar and a temperature of 283K, said system comprising:

at least one liquid product reservoir, a main circuit configured to extract a main product in the liquid state from the liquid product reservoir, and a recovery circuit comprising at least one thermal compressor configured to compress a gas at least in part by raising the temperature of said gas or of an intermediate agent such as a metal hydride, by means of a cold source and a hot source, and transfer means for transferring a recovery product resulting from evaporation within the liquid product reservoir to one of said at least one thermal compressor, the cold source of at least one of said thermal compressors being configured to receive cold energy from said main circuit.

2. A system for processing a product according to claim 1, wherein the main circuit comprises at least one evaporator and transfer means for transferring a main product in liquid state from the liquid product reservoir to one of said at least one evaporator.

3. System according to claim 1, wherein said cold source of at least one of said at least one thermal compressor comprises a cold circuit configured to be traversed by a heat transfer fluid thermally connected to said evaporator.

4. System according to claim 1, wherein said cold source of at least one of said at least one thermal compressor comprises a cold circuit configured to be traversed by said main product.

5. System according to claim 1, wherein the hot source of at least one of said at least one thermal compressor is thermally connected to the ambient air.

6. System according to claim 1, wherein the recovery circuit comprises:

at least one first thermal compressor, whose cold source is configured to receive cold energy from said main circuit and whose hot source is thermally connected to the ambient air, and downstream of said at least one first thermal compressor with respect to the movement of said second gaseous product, at least one second thermal compressor, the cold source of which is configured to receive cold energy from said main circuit or ambient air and the hot source of which is thermally connected to a source of waste heat or electric heating.

7. System according to claim 1 wherein at least one of said at least one thermal compressor is a multi-stage type thermal compressor comprising an upstream source, a target, and at least one group of reservoirs each comprising at least two reservoirs, said thermal compressor further comprising means for heating and means for cooling the content of each reservoir, said means for heating being connected to said hot source and said means for cooling being connected to the cold source, each group further comprising:

transfer means for transferring gas directly from said upstream source to each reservoir and directly from each reservoir to said target, and for each reservoir of said group, bidirectional transfer means enabling gas to be transferred directly between this reservoir and at least one other reservoir of said group.

8. Process for transforming a product located in a liquid product reservoir, said product being a product which is in the gaseous state when at a pressure of 1 bar and a temperature of 283K, said process comprising the following steps:

in a main circuit:

extraction of a main product in liquid state from said liquid product reservoir, in a recovery circuit:

evaporation of liquid product in said liquid product reservoir to obtain a gaseous recovery product, transferring said recovery product to at least one thermal compressor, in said at least one thermal compressor, compressing said recovery product at least in part by raising the temperature of said recovery product or of an intermediate agent such as a metal hydride, by means of a cold source and a hot source, said cold source receiving cold energy from said main circuit.

9. Process according claim 8, further comprising, in the main circuit, after the extraction step, a step of evaporation of said main product.

10. Process according to claim 8, in which the temperature of the liquid product in the liquid product reservoir is less than 123 K.

11. Process according to claim 8, in which the pressure of the gaseous product downstream of said at least one thermal compressor is greater than or equal to 300 bar.

12. Process according to claim 8, wherein said compression of the recovery product is carried out at least in part by a cyclic process of thermal compression of a gas in a plurality of reservoirs, each cycle comprising for each reservoir of said plurality of reservoirs the following steps:

cooling the gas contained in the reservoir and transferring gas from an upstream source to said reservoir, transfer of gas from a donor reservoir to said reservoir, said donor reservoir being at a higher pressure and temperature than the gas of said reservoir and of the same group, preferably said donor reservoir being the one whose gas is at the lowest pressure among the reservoirs of said group whose gas is at a higher pressure and temperature than the gas of said reservoir, until equalization of the pressures in said reservoir and said donor reservoir, if necessary repeating this step as long as there is a donor reservoir of said group whose gas is at a higher pressure and temperature than the gas in said reservoir, heating the gas contained in the reservoir and transferring gas from said reservoir to a target, transfer of gas from said reservoir to a receiving reservoir, said receiving reservoir being at a lower pressure and temperature than the gas from said reservoir, preferably said receiving reservoir being that whose gas is at the highest pressure among the reservoirs of said group whose gas is at a lower pressure and temperature than the gas from said reservoir, until equalization of the pressures in said reservoir and said receiving reservoir, if necessary repeating this step for as long as there is another reservoir of said group whose gas is at a lower pressure and temperature than the gas in said reservoir, the step of cooling the gas contained in the reservoir and transferring gas from the upstream source to said reservoir being carried out successively for each reservoir of said group.

* * * * *